United States Patent

Boinowitz et al.

[11] Patent Number: 5,993,529
[45] Date of Patent: Nov. 30, 1999

[54] RELEASE AGENT FOR RUBBER RADIATOR HOSES

[75] Inventors: Tammo Boinowitz, Essen; Helmut Lammerting, Herbede, both of Germany

[73] Assignee: Th. Goldschmidt AG, Essen, Germany

[21] Appl. No.: 09/135,667

[22] Filed: Aug. 18, 1998

[30] Foreign Application Priority Data

Aug. 19, 1997 [DE] Germany .......................... 197 35 995

[51] Int. Cl.$^6$ ................. B28B 7/36; B28B 7/38

[52] U.S. Cl. ............... 106/38.22; 106/38.2; 106/287.23; 106/287.26

[58] Field of Search ................. 106/38.2, 38.22, 106/287.23, 287.26; 508/579

[56] References Cited

U.S. PATENT DOCUMENTS

| | | |
|---|---|---|
| 4,263,250 | 4/1981 | Schmidt et al. ....................... 106/38.22 |
| 4,265,774 | 5/1981 | Langdon ................................. 508/579 |
| 4,326,999 | 4/1982 | Fink et al. ........................... 106/38.22 |
| 4,501,616 | 2/1985 | Fink et al. ........................... 106/38.22 |
| 5,334,322 | 8/1994 | Williams, Jr. ........................... 508/579 |

*Primary Examiner*—Michael Marcheschi
*Attorney, Agent, or Firm*—Scully, Scott Murphy & Presser

[57] ABSTRACT

The invention relates to a release agent and lubricant for rubber moldings, especially radiator hoses, which comprises a polyether which is liquid at room temperature, has a viscosity from 400 to 2000 mPas and is obtained by addition reaction of ethylene oxide with oligo- and polyglycerols, individually or in a mixture as initial alcohols, in which reaction from 3 to 15 mol of ethylene oxide are added on per hydroxyl group.

4 Claims, No Drawings

RELEASE AGENT FOR RUBBER RADIATOR HOSES

The invention relates to lubricants and release agents for rubber moldings.

In the production of rubber moldings, release agents are required in order to enable the molded rubber products to be removed from the molds and to prevent the moldings sticking to the mold walls. In many cases, however, a release agent of this kind is also required to reduce the friction of the rubber molding on the wall of a shaping element.

Particularly difficult lubrication and release problems arise in the production of the radiator hoses that are required, for example, in automotive construction and for washing and cleaning machines. In this case, a vulcanizable preform is pushed onto a mandrel which is itself highly complex in shape. Following vulcanization, the hot rubber molding needs to be stripped from the mandrel, which requires considerable application force. The force required is determined firstly by the shaping of the mandrel and secondly by the adhesion of the molding to the mandrel.

In order to avoid adhesion and to improve lubricity, preforms of this kind requiring vulcanization, which are to be pushed onto a curve mandrel, have been treated with dispersions of silicone oils, glycerol and waxes. Although this does reduce the adhesion and friction, it does not do so to a technically satisfactory extent.

A release agent and lubricant is described, for example, in European Patent Application EP-A-O 738 775, using polyesters prepared from a polyethylene glycol or a mixture of polyethylene glycols and from a linear dicarboxylic acid or a mixture of linear dicarboxylic acids. These liquid compounds of relatively low molecular weight are of low viscosity and have only a low ability to withstand compressive stress. With these compounds, the lubricating effect for the rubber preforms, especially preforms comprising polar rubber grades, is unsatisfactory in practice.

EP-A-O 537 891 discloses release agents for the production of radiator hoses which consist of copolymers of polyethylene oxide and polypropylene oxide. These release agents exhibit their good properties when used with apolar rubber grades, such as EPDM and diene rubber. However, when processing polar rubber grades, such as epichlorohydrin rubber and copolymers consisting of acrylates and ethylene, their effect gives minimal satisfaction. These polar rubber grades are extremely tacky and are therefore very difficult to demold with these prior art substances.

It is an object of the present invention to provide a release agent, especially for the processing of polar rubber grades, which does not have the above disadvantages.

Surprisingly, a release agent and lubricant has been found which comprises a polyether which is liquid at room temperature, has a viscosity of from 400 to 2000 mPas and is obtained by addition reaction of ethylene oxide with oligo- and polyglycerols, individually or in a mixture as initial alcohols, in which from 3 to 15 mol of ethylene oxide are added on per hydroxyl group.

The reason why these initial alcohols are particularly suitable is that they are in liquid form at room temperature. Polyglycerols employed in this context are di-, tri-, tetra-, penta-, hexa- and heptaglycerols and mixtures of these compounds. Polyglycerols of this kind are described, for example, in DE-A-34 10 520 and DE-A-36 00 388.

From 3 to 15, preferably 5 to 8, ethylene oxide mols. per hydroxyl group of said oligoglycerol or polyglycerol are added thereon. In this addition reaction, liquid products are obtained which have a viscosity of from 400 to 2000 mPas and are soluble in water. This is a necessity in order that these release agents can be washed off from the vulcanized hoses after the vulcanization process has finished.

In order to optimize the performance properties it is possible to add up to 10% of customary additives (for example, anticorrosion agents, stabilizers, antioxidants and wetting agents).

As wetting agents for improving the wash-off properties it is possible to use the known anionic surfactants. Sodium lauryl ether sulfate is particularly suitable. Other wetting agents are, for example, the dodecylbenzenesulfonates.

As anticorrosion agents it is likewise possible to use the products known from the prior art. A suitable example is the triethanolammonium salt of an alkylarylamidocarboxylic acid.

The following examples show first of all the preparation of the lubricants and release agents of the invention and, subsequently, illustrate their performance properties.

EXAMPLE 1

Preparing the Lubricants and Release Agents of the Invention a) 362 g of tetraglycerol and 12.92 of 50% strength aqueous KOH were filled into a laboratory autoclave with intensive cooling facility. The water was distilled off at 120° C. and then 2148 g of ethylene oxide were metered in continuously at 150° C. Following the end of this addition, the reaction mixture was left to react further until constant pressure was obtained. The product was subsequently adjusted with phosphoric acid to an acid number of from 0 to 1 mg of KOH/g. After drying, the precipitated salt was removed by filtration.

b) 313 g of triglycerol and 14.62 g of 50% strength aqueous KOH were filled into a laboratory autoclave with intensive cooling facility. The water was distilled off at 120° C. and then 2180 g of ethylene oxide were metered in continuously at 150° C. Following the end of this addition, the reaction mixture was left to react further until constant pressure was obtained. The product was subsequently adjusted with phosphoric acid to an acid number of from 0 to 1 mg of KOH/g. After drying, the precipitated salt was removed by filtration.

EXAMPLE 2

Preparing and Applying a Formulation Comprising the Lubricants and Release Agents of the Invention, and Testing the Lubrication and Release Properties a) 97 parts of the novel substance of Example 1a)

2 parts of anticorrosion agent 1 part of antioxidant

This formulation is produced by simple low-shear mixing in a stirred vessel. All of the substances are soluble in each other. The formulation produced has a viscosity of 900 mPas. The performance of this formulation is examined in a radiator hose production process. For this purpose, an unvulcanized hose section made from acrylate rubber, with a length of 750 mm and an internal diameter of 28 mm, is dipped into a release agent formulation, and the release agent runs into the interior of the hose where it wets the wall. 5 g of release agent are required for the hose section. Immediately thereafter, this hose section is pushed manually onto a curved mandrel. In the course of this procedure, very low pushing forces are observed. The hose section is subsequently vulcanized using a steam-heated vulcanization vessel at 180° C. The vulcanization time is 20 minutes. The vulcanized hose section is subsequently removed from the mandrel. The fully vulcanized molding can be taken off from the mandrel without substantial effort. This cycle is carried out about 60 times in parallel on 20 to 30 mandrels. The appearance of the mandrels subsequently was excellent.

b) 70 parts of the novel substance of Example 1a)

27 parts of a polyester based on polyethyleneglycol and adipic acid 2 parts of anticorrosion agent 1 part of antioxidant This formulation is likewise produced by low-shear mixing in a stirred vessel. The resulting viscosity is about 1800 mPas. The performance of this formulation is examined in a radiator hose production process in the same way as in Example 2a). In this case too, very low pushing forces and removal forces were observed.

c) 97 parts of the novel substance of Example 1b)

2 parts of anticorrosion agent 1 part of antioxidant

These substances are soluble in one another and can be mixed by low-shear mixing in a stirred vessel. The resulting mixture has a viscosity of 700 mPas. This formulation is employed in the same way as in Example 2a). In this case too, very low pushing forces are found and in each case following vulcanization there are no difficulties in separating the molding from the mandrel.

d) A formulation as in Example 2b) is used.

This formulation is examined in a radiator hose production process in the same way as in Example 2a). In this case, however, a hose section made from EPDM rubber of comparable dimensions is vulcanized. Here again, very low pushing forces are found. Following vulcanization, there were no difficulties in separating the molding from the mandrel.

e) Not in accordance with the invention

A prior art release agent is examined. This is a copolymer of ethylene oxide and propylene oxide having an average molecular weight of 2800. The ratio of ethylene oxide to propylene oxide is 30:70. This product was examined in a radiator hose production process in the same way as in Example 2a). It is found that the pushing-on of the preforms and the removal of the fully vulcanized hoses is associated with greater exertion, with otherwise analogous procedure and tools of the same geometry.

f) Not in accordance with the invention

Here again, a prior art substance is used. This is a polyethylene glycol having a molecular weight of 600. When examined in a house production process as in Example 2a), it is again found difficult to push on the preforms. Removal of the fully vulcanized hoses was virtually impossible.

EXAMPLE 3

Washing off the release agents and lubricants from the vulcanized hoses.

The hose sections demolded in accordance with Example 2a) to f) are treated in an industrial washing machine at 40° C. for about 15 minutes in order to remove the residues of the release agent. The release agent residues following Example 2e) were distinctly more difficult to wash off. Following the treatment, the hose was still greasy. In the other cases, good solubility and hence good wash-off properties of the release agents used were found.

The evaluation of the tests described here shows that the release agents and lubricants of the invention ensure a frictionless production and thereby permit for the first time the production of temperature-stable, high-quality moldings from polar rubber grades.

What is claimed is:

1. A release agent for rubber radiator hoses which consists essentially of a polyether which is liquid at room temperature, has a viscosity of from 400 to 2,000 mPas and is obtained by an addition reaction of ethylene oxide and at least one oligoglycerol or polyglycerol wherein from 3 to 15 mols of ethylene oxide are added per hydroxyl group of said oligoglycerol or polyglycerol, said release agent utilized in the release of rubber radiator hoses after said hoses are subjected to steam vulcanization.

2. A release agent in accordance with claim 1 which further consists essentially of additives selected from the group consisting of anticorrosion agents, stabilizers, antioxidants, and wetting agents.

3. A release agent in accordance with claim 1 wherein 5 to 8 mols of ethylene oxide are added per hydroxyl group of said oligoglycerol or said polyglycerol.

4. A release agent in accordance with claim 3 which further consists essentially of additives selected from the group consisting of anticorrosion agents, stabilizers, antioxidants, and wetting agents.

* * * * *